Jan. 24, 1950 J. F. O'BRIEN ET AL 2,495,279
ELECTRICAL INTERCONNECTION DEVICE
Filed March 14, 1946 2 Sheets-Sheet 1
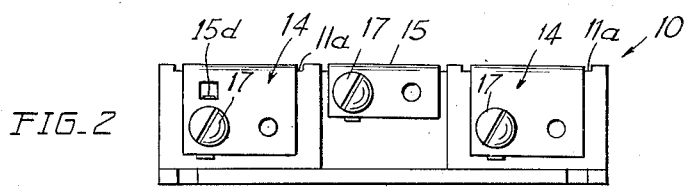
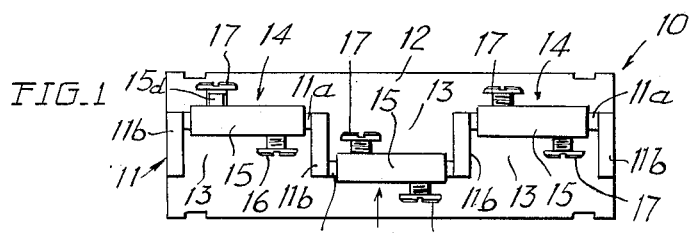
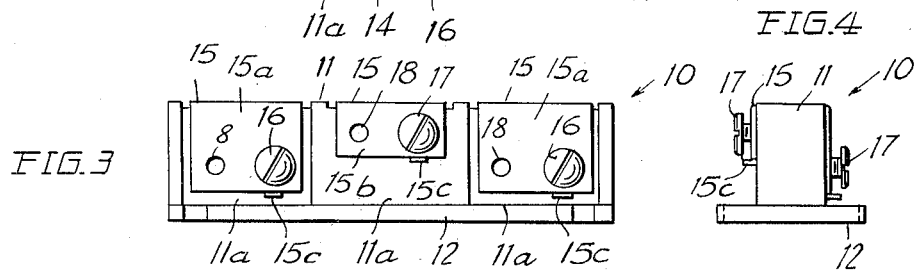
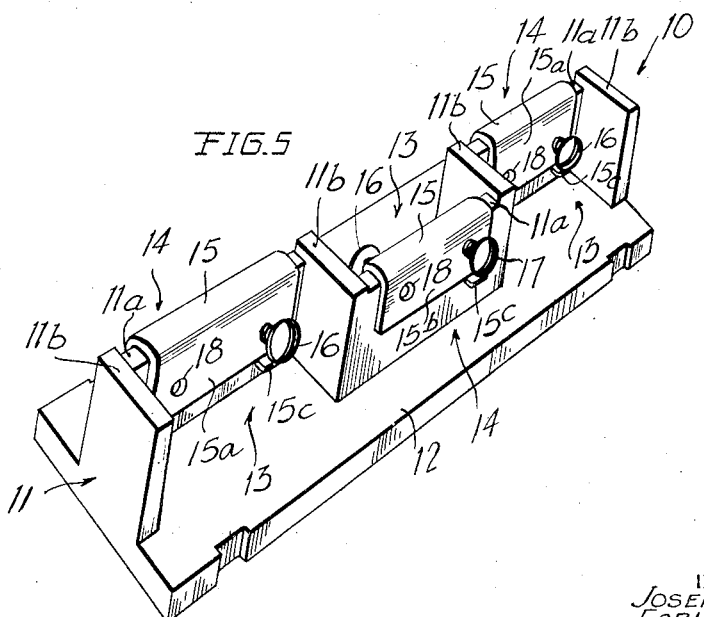
INVENTORS
JOSEPH F. O'BRIEN
EARL S. BOYNTON
BY
ATTORNEY Jan. 24, 1950     J. F. O'BRIEN ET AL     2,495,279
ELECTRICAL INTERCONNECTION DEVICE
Filed March 14, 1946     2 Sheets-Sheet 2
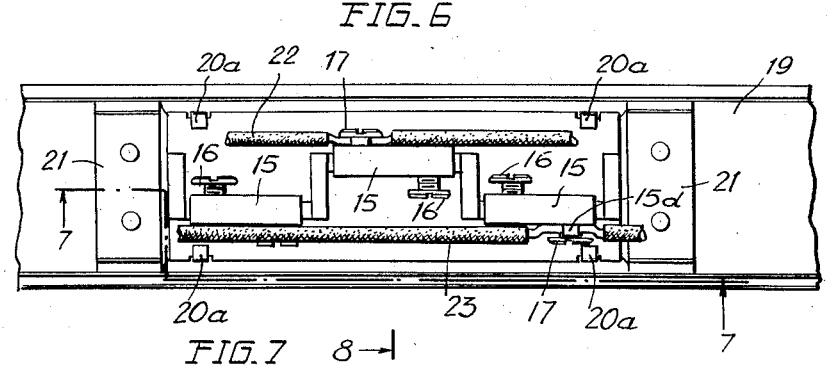
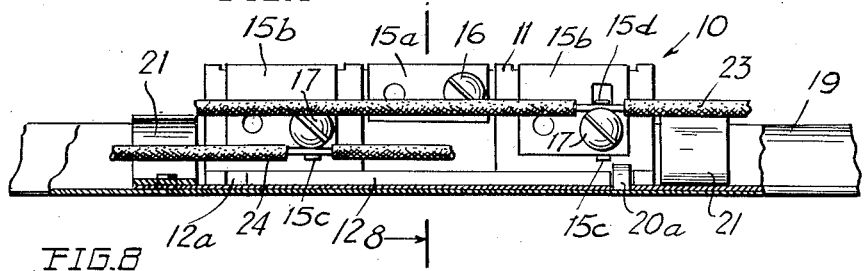
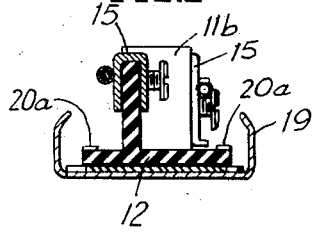
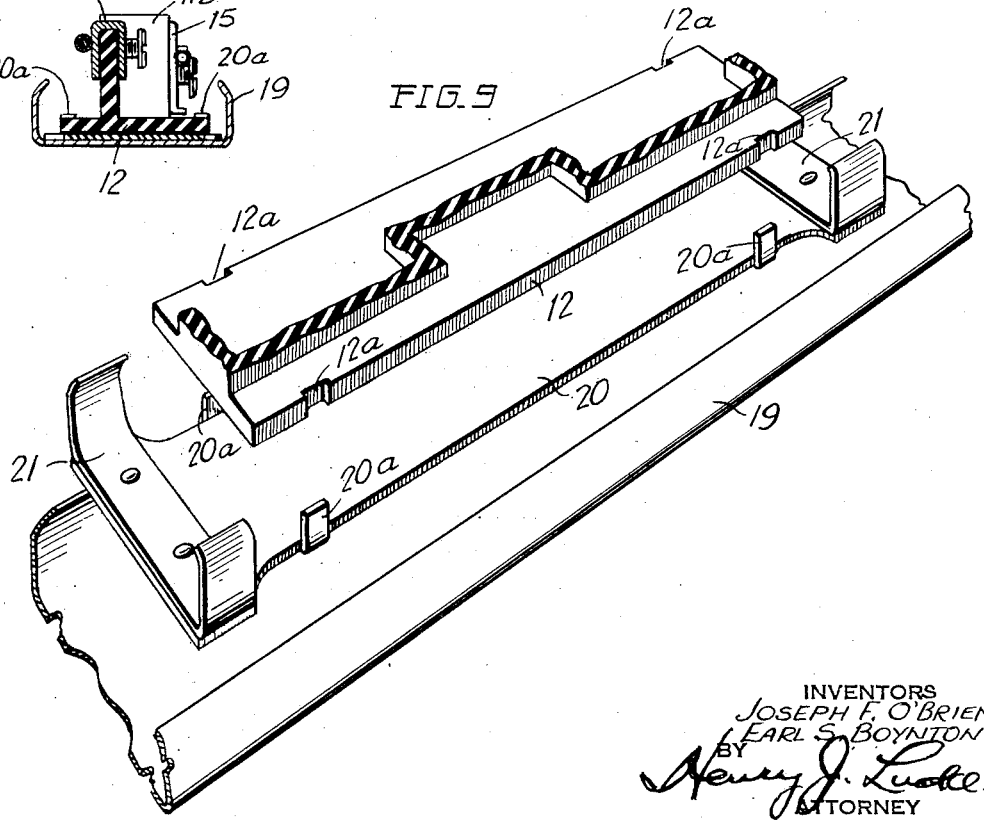
INVENTORS
JOSEPH F. O'BRIEN
EARL S. BOYNTON
BY
ATTORNEY Patented Jan. 24, 1950

2,495,279

UNITED STATES PATENT OFFICE 2,495,279

ELECTRICAL INTERCONNECTION DEVICE

Joseph F. O'Brien, Lebanon, and Earl S. Boynton, East Orange, N. J., assignors to John B. Pierce Foundation, New York, N. Y., a corporation of New York Application March 14, 1946, Serial No. 654,322

1 Claim. (Cl. 173—324)

The invention relates to electrical interconnection devices.

More particularly, the invention relates to devices for interconnecting electrical conductors, and especially to electrical interconnection devices for connecting an electrical wiring system to a source of electrical power.

In our copending application Serial No. 652,599, filed March 7, 1946, entitled Surface wiring system, now abandoned, there is disclosed a novel conduit wiring system wherein the electrical conductors and associated auxiliary devices, such as outlet receptacles and the power feed means, are mounted on a conduit cover part, which is arranged for removable "snap-on" association with a conduit base part. The power feed means, there advantageously employed, forms the subject matter of the instant patent application, and is applicable generally as an interconnector for electrical conductors.

It is an object of the invention to provide an electrical interconnection device which affords quick and reliable interconnection of electrical conductors, such as the electrical conductors of a wiring system with the electrical conductors leading from the power source.

An object of the invention is to provide an electrical interconnection device which, in its structural characteristics, serves to accommodate any desired number of electrical conductors to be interconnected, and, further, which is simple in construction, and capable of economical manufacture.

An object of the invention is to provide a structural combination which affords installation of the device most effectively in a conduit type of wiring system.

A feature of the invention is the attainment of the above objects and resides in the provision of a connection block having what is herein termed alternately re-entrant walls of insulating material, each corrugation of which seats, at an end thereof, a saddle contact affording electrical connection at each of its side members. In such manner, the number of sets of electrical conductors which may be effectively interconnected depends upon the selected number of alternate re-entrant parts of the interconnection device and upon the dimensions of the contacts.

A feature of the invention resides in the provision of a resilient "snap-in" base arrangement for the above connection block, whereby the device may be removably secured at any desired location along the length of a longitudinally separable wiring conduit.

Other objects and features of the invention will be apparent from the following detailed description and a preferred specific embodiment illustrated in the accompanying drawings, in which:

Fig. 1 is a plan view of a preferred embodiment of connection block and associated contacts of the device as they appear removed from the resilient base arrangement;

Fig. 2 is a back elevation of the parts of Fig. 1, as they appear when reflected from a mirror;

Fig. 3 is a front elevation of Fig. 1;

Fig. 4 is an end elevation of Fig. 1;

Fig. 5 is an enlarged perspective top view of Fig. 1;

Fig. 6 is a top plan view of Fig. 1, shown assembled with the resilient base arrangement, as installed in a conduit part of a conduit-type wiring system, the electrical conductors of the system being shown connected to the device, but not the corresponding leads from power source cable;

Fig. 7 is a side elevation, partly in vertical section taken on line 7—7 of Fig. 6;

Fig. 8 is a vertical section taken on line 8—8 of Fig. 7; and

Fig. 9 is an enlarged exploded perspective view of the resilient base arrangement, the base portion of the connection block being included.

Referring to the drawings and particularly Figs. 6, 7, and 8, the electrical interconnection device is constructed for installation in the conduit wiring system set forth in our above-referred-to copending application for patent Ser. No. 652,599. However, it will be apparent that the interconnector device possesses general application, particularly in those situations where it is desired to interconnect electrical conductors, such as conventional flexible wire leads, relatively inflexible rods or tubings, or combinations of such types, or the like.

In general, the interconnection device comprises a connection block, a feature of which is what is herein termed its alternately re-entrant insulation wall structure, serving to afford a series of desired connection zones along the length of the wall individually electrically insulated from one another.

The connection block 10 in the illustrated embodiment is shown having an alternately reentrant wall portion 11 and a mounting base portion 12, which are preferably formed integral with each other and of a molded plastic composition material having the desired electrical insulating properties, such as "Bakelite."

The alternate re-entrant wall 11 is advantageously formed of longitudinal members 11a and alternating transverse members 11b which impart to the alternate outer zones 13 and inner zones 14 a sharply rectangular formation. Such formation is desirable in that it provides very effectively for electrical isolation of the several connection zones. Rising at the opposite ends and at their mid portions of the base 12 and parallelly thereto at intermediate locations are walls 11b, shown four in number, which are interconnected on their respective edges by the longitudinally extending walls 11a, shown three in number, these walls 11a, 11b, forming the stated alternately reentrant wall 11. The longitudinally extending wall members 11a are preferably somewhat less in height than the transverse wall members 11b, as shown, thereby providing seats for the saddle contact elements 15. Such saddle contact elements 15 are positioned astride the respective longitudinal wall members 11a, with their depending side members 15a and 15b lying against the inner and outer wall faces, respectively, of its associated longitudinal wall member, that is to say, with the side member 15a lying in an outer zone 13 and the side member 15b lying on an inner zone 14. Each saddle contact element 15 provides an electrical connection zone which is electrically isolated from the adjoining connecting zone or zones, and each electrical connection zone provides for the interconnection of a plurality of electrical conductors in common circuit arrangement.

In the illustrated embodiment, electrical connection is provided for by screw binding posts, one, designated 16, being threaded into the side member 15a of each saddle contact element, and another, designated 17, into the side member 15b thereof. Provision is desirably made, as shown, for the screw binding posts to thread entirely through the insulating wall member and into a corresponding tapped opening 18 in the opposite side member of the particular saddle contact element concerned when cinched down tight, thereby affording an enhanced electrical connection and more effectively securing each saddle contact element individually mechanically to its supporting wall member. If desired, small retaining tits 15c and 15d may be struck from the contact plates to aid in making and maintaining good connections with the electrical conductors.

In the instance of the illustrated embodiment, the aforedescribed connection block is provided with a resilient base arrangement affording easily removable installation at any desired location along the length of a conduit cover part 19, see Figs. 6 through 9, such as of the type of conduit wiring system set forth in detail in our above referred to copending application Ser. No. 652,599. Such conduit cover part 19 is shown of longitudinally extended channel formation, a portion only being indicated in Figs. 6, 7 and 9. In such conduit electrical system the electrical interconnection device of the instant invention is formed to "snap" into the channel of the conduit system and maintained in position by the resilient nature of the base material and arrangement.

As illustrated, see especially Fig. 9, the resilient base arrangement comprises a base plate 20 having resilient clip elements 21, 21 secured, as by riveting, to opposite ends thereof, such clip elements being of approximately the same channel formation as the conduit cover part 19, though dimensioned to fit with the same and resiliently hug the inner walls thereof.

The mounting base portion 12 of the connection block 10 is shown having notches 12a, 12a, 12a, and 12a, formed in its longitudinal edges, to accommodate the corresponding clasp members 20a, 20a, 20a, and 20a, struck up from the longitudinal edges of base plate 20, such clasp members being bent over upon the connection block base portion 12, to thereby securely fasten the connection block to the resilient base arrangement, as shown in Figs. 7 and 8.

In the installation illustrated, the conduit wiring system is equipped with three electrical conductors 22, 23 and 24, which are preferably of relatively stiff, hand-drawn, copper wire, insulatedly sheathed. In order to accommodate the two parallelly extending electrical conductors 23 and 24, the side members 15b of the two saddle contact elements which are at the ends of the series are longer than are the side members 15b of that saddle contact element which is disposed in the middle of the series, see Figs. 6 and 7, thereby illustrating a satisfactory dimensional arrangement of the saddle contact elements and the corrugated wall of the connection block.

The electrical interconnection device shown in Figs. 6, 7, and 8 is particularly adapted to provide electrical interconnection of three running conductors 22, 23 and 24 of the conduit wiring system with the respective leads of power source cable. Such power source cable is not here illustrated, but connection for the respective leads thereof is provided by the respective screw binding posts 16, 16, and 16. Accordingly, the interconnection device here affords a series of three separate and mutually electrically isolated electrical connections along its length. By extending the length of the corrugated wall member 11 a correspondingly increased number of similar electrical connections is provided for.

While the invention has been illustrated and described with respect to a preferred specific embodiment thereof, it should be understood that various changes may be made in said embodiment and various other embodiments may be constructed by those skilled in the art without departing from the spirit and generic purview of the invention as defined by the following claim.

We claim:

In an electrical connection device, a connection block comprising an integral insulating wall portion of a plurality of substantially alternately reentrant formations giving rise to alternate inner and outer zones, and a mounting base portion disposed substantially perpendicularly thereto; a base plate attached to said mounting base portion; a channel mounting strip secured to said base plate; resilient clip members spaced apart on said base plate, said clip members being of upstanding channel formation adapted to engage the inside walls of said channel mounting strip and associated connection block within said channel mounting strip; and contact elements of substantially saddle formation positioned astride said wall portion, each of said contact elements having one of its side members lying in an outer zone of said wall portion and the other of its side members lying on the corresponding inner zone at the opposite side of said wall portion.

JOSEPH F. O'BRIEN.
EARL S. BOYNTON.

REFERENCES CITED

The following references are of record in the file of this patent:

UNITED STATES PATENTS

| Number | Name | Date |
|---|---|---|
| 396,920 | Chamberlain | Jan. 29, 1889 |
| 1,857,378 | Hubbell | May 10, 1932 |
| 2,058,745 | Weber | Oct. 27, 1936 |
| 2,119,776 | Clayton | June 7, 1938 |
| 2,358,346 | O'Brien | Sept. 19, 1944 |